United States Patent [19]

Pristash et al.

[11] Patent Number: 4,755,918

[45] Date of Patent: Jul. 5, 1988

[54] REFLECTOR SYSTEM

[75] Inventors: David J. Pristash, Brecksville; Timothy J. Bodnar, Mentor, both of Ohio

[73] Assignee: Lumitex, Inc., Royalton, Ohio

[21] Appl. No.: 34,840

[22] Filed: Apr. 6, 1987

[51] Int. Cl.$^4$ ............................................. F21V 7/00
[52] U.S. Cl. ................................. 362/301; 362/303; 362/32
[58] Field of Search .............. 362/32, 297, 301, 303, 362/804, 302

[56] References Cited

U.S. PATENT DOCUMENTS

| | | | |
|---|---|---|---|
| 1,575,327 | 3/1926 | Garford et al. | 362/303 |
| 1,995,012 | 3/1935 | Rivier | 362/303 |
| 3,267,274 | 8/1966 | Johnson | 362/303 |
| 3,770,338 | 11/1973 | Helmuth | 350/96 |
| 4,241,382 | 12/1980 | Daniel | 362/32 |
| 4,305,099 | 12/1981 | True et al. | 362/302 |
| 4,443,834 | 4/1985 | Schafer et al. | 362/303 |
| 4,447,865 | 5/1984 | VanHorn et al. | 362/297 |
| 4,494,176 | 1/1985 | Sands et al. | 362/297 |
| 4,536,834 | 8/1985 | Sands et al. | 362/297 |
| 4,654,758 | 3/1987 | Szekacs | 362/302 |

FOREIGN PATENT DOCUMENTS

| | | | |
|---|---|---|---|
| 119470 | 10/1919 | United Kingdom | 362/302 |
| 763376 | 12/1956 | United Kingdom | 362/302 |

Primary Examiner—Charles J. Myhre
Assistant Examiner—David A. Okonsky
Attorney, Agent, or Firm—Renner, Otto, Boisselle & Sklar

[57] ABSTRACT

Reflector system includes a reflector having an ellipsoidal portion and a hemispherical portion joined together at the intersection of a plane passing through one of the foci of the ellipsoidal portion normal to the major axis of the ellipsoidal portion. A light source is generally positioned at the focus. The ellipsoidal portion extends forwardly of the focus and terminates in an opening covered by a mirror extending normal to the major axis of the ellipsoidal portion for redirecting light rays emanating from the light source back through the reflector. The center axis of the hemispherical portion intersects the focus, and such hemispherical portion extends rearwardly of the focus and terminates in another opening through which the light rays are redirected by the mirror to a final focus located exteriorly of the reflector.

26 Claims, 3 Drawing Sheets

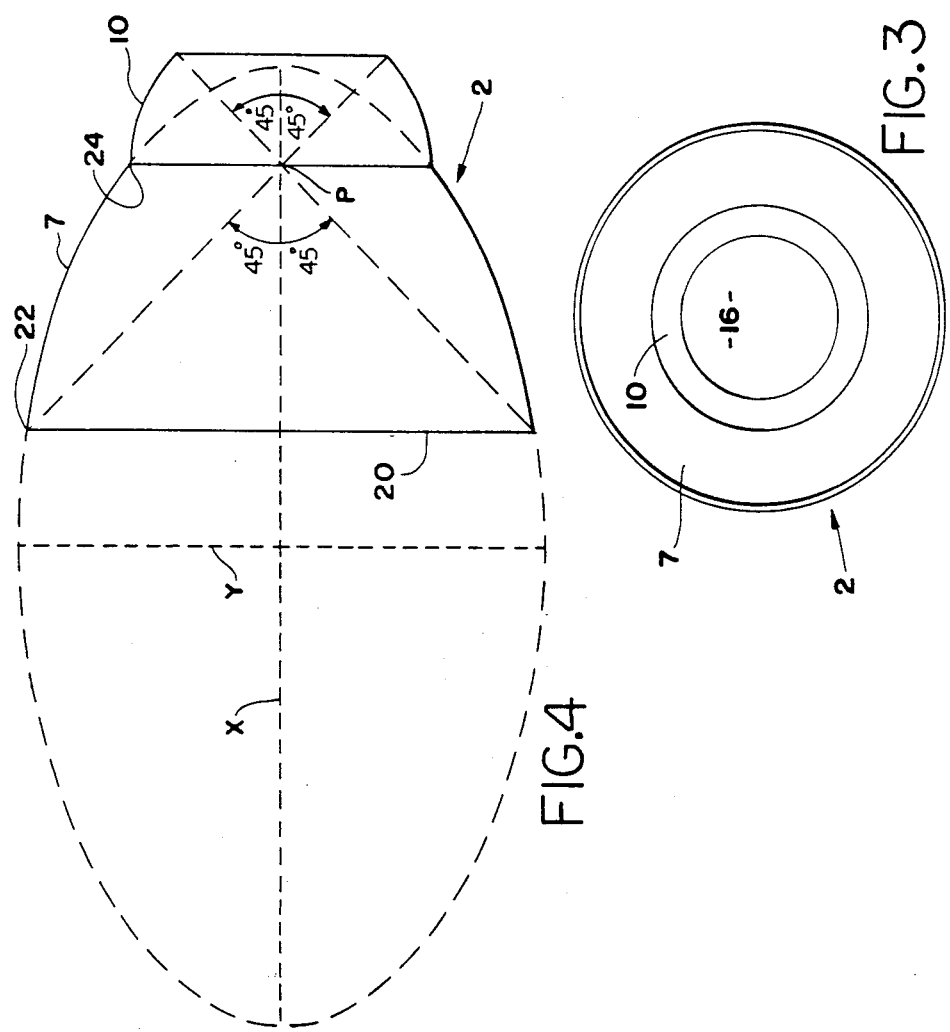

REFLECTOR SYSTEM

BACKGROUND OF THE INVENTION

This invention relates generally, as indicated, to a reflector system, and more particularly, to a reflector system which provides for relatively efficient light collection and focalization upon a relatively tight target or light receiving area.

It is generally known from U.S. Pat. No. 4,241,382 to provide an illuminator in the form of a light bulb including a combination of ellipsoidal and spherical mirrors which together direct the light emitted from a filament or other light source through a small optical window located at the rear of a fiber optics coupler integral with the bulb envelope into a fiber optics light pipe or the like. To facilitate trapping of the light in the optical fibers, the light may be caused to emerge from the optical window at angles equal to or less than the critical angles of the fibers.

Also, it is generally known from such U.S. patent to provide a multilayer interference film on the ellipsoidal reflector which is highly reflective of visible light and highly transmissive of heat or infra-red radiation to allow most heat to escape into the surroundings instead of being focused onto the fiber optics ends.

While such an illuminator is fairly efficient in directing the light generated by a filament into the end of an attached fiber optics light pipe within the limitations of losses incurred by non-ideal optical components, there is a continuing need for greater efficiencies in light collection and focalization on a limited target as in the case of channeling light into a fiber optics cable or the like.

In most lighting systems, it is desirable to extract the highest possible light output in lumens per watt of energy input while achieving an adequate amount of intensity. In the usual case, little effort is made to efficiently collect the existing light. Instead, a more intensive light source is utilized than would otherwise be required to make up for the inefficiencies in the light collector. However, there are many applications in which this is not desirable or acceptable such as when light is being channeled into an acrylic (plastic) fiber optics cable because of the damage that may result from the excess heat generated by an overly bright light source.

A relatively efficient light source is generally no more than 50% efficient. That is, for every watt of energy in the optical range generated, another watt of non-optical energy is simultaneously generated. Arc lamps and metal-halide lamps are in the higher range of optical efficiencies, whereas incandescent lamps are in the lowest range. Accordingly, any increase in the wattage of a lamp to increase its brightness will proportionately increase the existing infra-red energy which could cause heat problems.

Another objection to many illuminators including that shown in the aforementioned U.S. Pat. No. 4,241,382 is that they require an elongated construction which in many cases does not readily lend itself to an acceptable compact package shape.

SUMMARY OF THE INVENTION

With the foregoing in mind, it is a principal object of this invention to provide a reflector system for obtaining more efficient collection and focalization of light on a limited target.

Another object is to provide such a reflector system which is capable of both efficient focal optimization and heat removal.

Still another object is to provide such a reflector system which has a relatively short overall length thus greatly facilitating the compact packaging of the reflector system.

These and other objects of the present invention may be achieved by providing a hybrid reflector system that combines both ellipsoidal and hemispherical shapes to collect and focus the light on a limited target. The ellipsoidal portion of the reflector desirably commences at the intersection of a plane passing through a first focus normal to the major axis of the ellipsoid and extends in the direction of the major axis toward the minor axis. The hemispherical portion also desirably commences at the same place as the ellipsoidal portion but extends in the opposite direction from the ellipsoidal portion. At the end of the ellipsoidal portion furthest from the first focus is a relatively large opening covered by a mirror extending normal to the major axis to redirect light rays emitted from a light source placed generally in the region of the first focus back through a much smaller opening or mouth at the rearmost end of the hemispherical portion. Preferably such mirror is a dichroic (cold) mirror having suitable multi-layered coatings thereon to allow certain bandwidths of energy to pass through the mirror, for example, the majority of the initially emitted infra-red radiation, and to reflect substantially only the usable non-detrimental optical portion of the radiation incident upon the mirror.

The mirror should be positioned no closer to the light source than the point at which a ray of light emanating from the light source at approximately 45° as measured from the major axis meets the ellipsoidal portion of the reflector. This assures that the maximum amount of rays which impinge on the ellipsoidal portion will follow the classical ellipsoidal path and be reflected back by the mirror out through the open mouth of the hemispherical portion of the reflector to a final focus for the light suitably located far enough outside the reflector mouth to allow operation free from the danger of high ambient temperatures inside the reflector and for ease of further optical manipulation. If desired, another mirror may be oriented approximately 45° to the mouth of the reflector for redirecting the light rays passing out through the mouth to a final focus whose axis is normal to the mouth (reflector) axis. This mirror may also be a cold mirror to further assist in eliminating any additional non-optical energy from the light rays before being reflected onto the target.

For best results, the reflector should be constructed so that the mouth opening edge, the place where the ellipsoidal and hemispherical portions meet, the large opening edge, and the edge of the target should all fall in a substantially straight line when the reflector is viewed in a two-dimension longitudinal sectional view. Also, when the reflector is constructed out of glass, a suitable reflective coating for the glass may be a dichroic thin film to aid in heat removal from the system.

To the accomplishment of the foregoing and related ends, the invention, then, comprises the feature hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 2 is a longitudinal sectional view, on a reduced sale, of the reflector by itself;

FIG. 3 is an end elevation view of the reflector of FIG. 2 as seen from the left end thereof;

FIG. 4 is an enlarged schematic illustration showing in greater detail the geometry of the reflector.

DETAILED DESCRIPTION OF THE PREFERRED EMBODIMENTS

Figure 1:
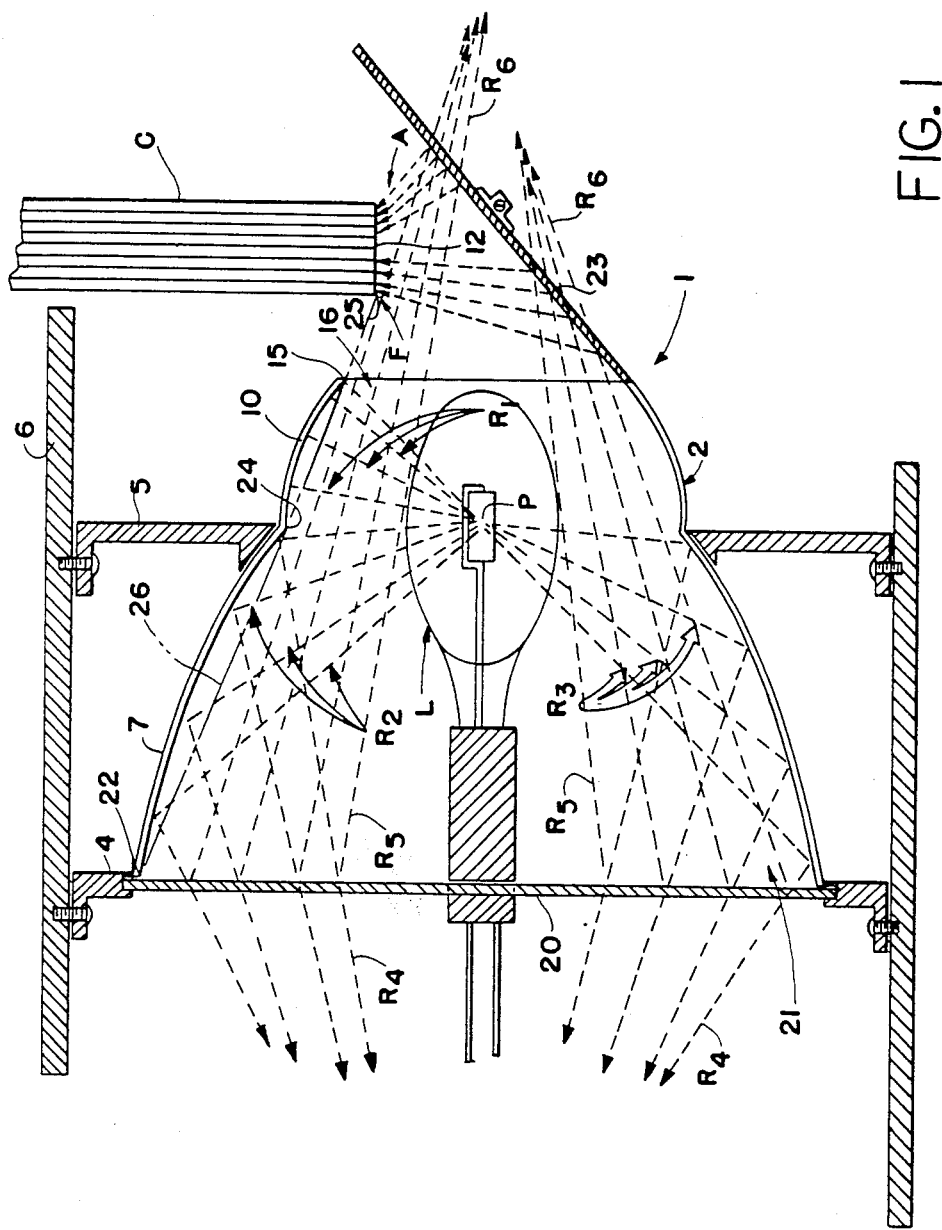
FIG. 1 is a schematic longitudinal sectional view through a preferred form of reflector system in accordance with this invention.

Referring now in detail to the drawings, and initially to FIG. 1, there is shown a preferred form of reflector system 1 in accordance with this invention including a reflector 2 for collecting light rays emitted from a light source L mounted within the reflector and focusing such light rays on a relatively tight target or light receiving area A outside the reflector. Suitable mounting brackets 4,5 may be provided for mounting the reflector 2 within a box or housing 6 as schematically illustrated.

Reflector 2 is a hybrid reflector which combines both ellipsoidal and hemispherical shapes as described hereafter, and may be constructed from any suitable material such as aluminum, glass or nickel coated with an acceptable reflective coating such as enhanced (dielectric) aluminum or overcoated silver. When the reflector is constructed out of glass, a suitable reflective coating for the glass may be a dichroic thin film to aid in heat removal from the system.

The reflector includes an ellipsoidal portion 7 to take advantage of the inherent geometrical properties of ellipsoidal shapes which are ideal for focusing light into a small opening or target. As is well known, any point light source placed at one of the foci of an ellipse will emit light rays that will always converge on the other focus. Unfortunately, however, there is no true point source light emitter, and the further one deviates from a point light source in a true elliptical or ellipsoidal reflector, the worse the defocus becomes.

In accordance with one aspect of the invention, it has been found that if the portion 10 of the reflector 2 rearwardly of the first focus P on the major axis X (shown schematically in FIG. 4) is formed to provide a hemispherical shape having its axis substantially coinciding with the first focus P, a large portion of the defocus is greatly reduced. The purpose of the hemispherical portion 10 of the reflector 2 is to take the light rays $R_1$ emanating from the light source L placed in the region of the first focus P that would otherwise have impinged on the rear portion of a conventional ellipsoidal reflector and lost to defocus and redirect them back through the light source so that these reflected light rays $R_3$ also eventually strike the ellipsoidal portion 7 forwardly of the first focus. By this technique, substantially half of the 90° emitted arc from a lamp L placed substantially at the first focus P which impinges on the hemispherical portion 10 will be reflected back through the lamp untileventually substantially all of the rays $R_1$, $R_2$ leaving the lamp will strike the ellipsoidal portion 7 forwardly of the first focus P.

In actual tests, it has been found that the portion of an ellipsoidal reflector forwardly of the first focus is more forgiving of deviation from a point light source than the portion rearwardly of the first focus. Accordingly, substituting a hemispherical portion 10 for the ellipsoidal portion of a conventional ellipsoidal reflector to the rear of the first focus P to redirect the light rays back to the ellipsoidal portion 7 forwardly of the first focus will result in an overall smaller loss of light at the second focus F than its purely elliptical counterpart.

In accordance with another aspect of the invention, the reflector system 1 was designed to channel light into a relatively tight target or light receiving area A at the final focus F such as the end 12 of a fiber optics cable C having a diameter, for example, of 1.5 inches. Not only does this require the tailoring of the final focus F as close to the cable diameter as possible, but also requires that the light be focused on the fiber optics ends at angles within the limited acceptance angle for the particular optical fibers being used, such as a 60° solid angle cone.

Also in accordance with the invention, the final focus F is desirable located outside the reflector 2, and the hemispherical portion 10 is sized so that the edge 15 of the small opening or mouth 16 at the rearmost end of the hemispherical portion 10 does not block a significant amount of radiation being reflected by the ellipsoidal portion 7 and still bounces the initial ray $R_1$ emitted from the lamp L back onto the ellipsoidal portion as reflected rays $R_3$ as schematically shown in FIG. 1.

Another important aspect of the reflector system 1 of the present invention is the manner in which the light is reflected back through the small opening or mouth 16 at the rearmost end of the hemispherical portion 10 of the reflector. In most conventional ellipsoidal reflectors, the light rays emanating from a light source at a first focus are collected at a second focus within the reflector itself. A major objection to this is that the overall lighting system must be of an elongated construction which in many cases does not provide an acceptable package shape.

In accordance with the invention, the reflector system 1 is made much more compact by shortening up its length and placing a mirror 20 at a large opening 21 where the ellipsoidal portion 7 of the reflector terminates forwardly of the first focus P for redirecting the light rays $R_2$, $R_3$ impinging on the ellipsoidal portion 7 back through the small opening or mouth 16 at the rearmost end of the hemispherical portion 10. If desired, mirror 20 can be a conventional silver coated mirror which will redirect all of the light rays back through the mouth 16 of the reflector. However, mirror 20 is preferably a dichroic mirror of known type having suitable multi-layered coatings thereon similar to that used in the General Electric Company's Quartz Line reflector lamps to allow certain bandwidths of energy to pass through the mirror and cause reflection of others. By using the proper deposition of materials on the mirror, the first 85% to 90% of the initially emitted infra-red radiation $R_4$ can be eliminated so that substantially only the optical wavelengths $R_5$ of the radiation incident upon the mirror are redirected back through the mouth of the reflector.

The actual placement or location of the mirror 20 is important in order to assure that the maximum amount of light rays emitted from the light source L will follow the classical elliptical path and be directed back through the open mouth 16 of the reflector. To that end, it has been found that the mirror 20 should be placed no closer to the light source L than the point 22 at which a 45° ray emanating from a point light source at the first focal point P meets the internal surface of the elliptical portion 7 of the reflector as schematically shown in FIGS. 2 and 4. At the same time, the mirror 20 should not be moved much further away from the light source L or the final focus F will move back into the mouth 16 of the reflector. Any movement of the mirror 20 further away from the light source (at the first focus P) will cause the final focus F to move twice that amount toward the mouth 16 of the reflector.

In that regard, it is preferred to locate the final focus F sufficiently far outside the reflector mouth 16 to allow operation free from the danger of high ambient temperatures within the reflector 2 and for ease of further optical manipulation. For example, another mirror 23 may be mounted adjacent the reflector mouth oriented at an angle of approximately 45° to the normal of the reflector mouth for redirecting the light rays passing through the reflector mouth onto the end 12 of a fiber optics cable C whose axis is normal to the mouth (reflector) axis as schematically shown in FIG. 1. If desired, mirror 23 may be a dichroic mirror similar to the mirror 20 previously described for eliminating additional infra-red radiation $R_6$ emitted from the light source. This mirror 23 coupled with mirror 20 will remove substantially all non-optical energy rays $R_4$, $R_6$ emitted by the light source.

Figure 5:
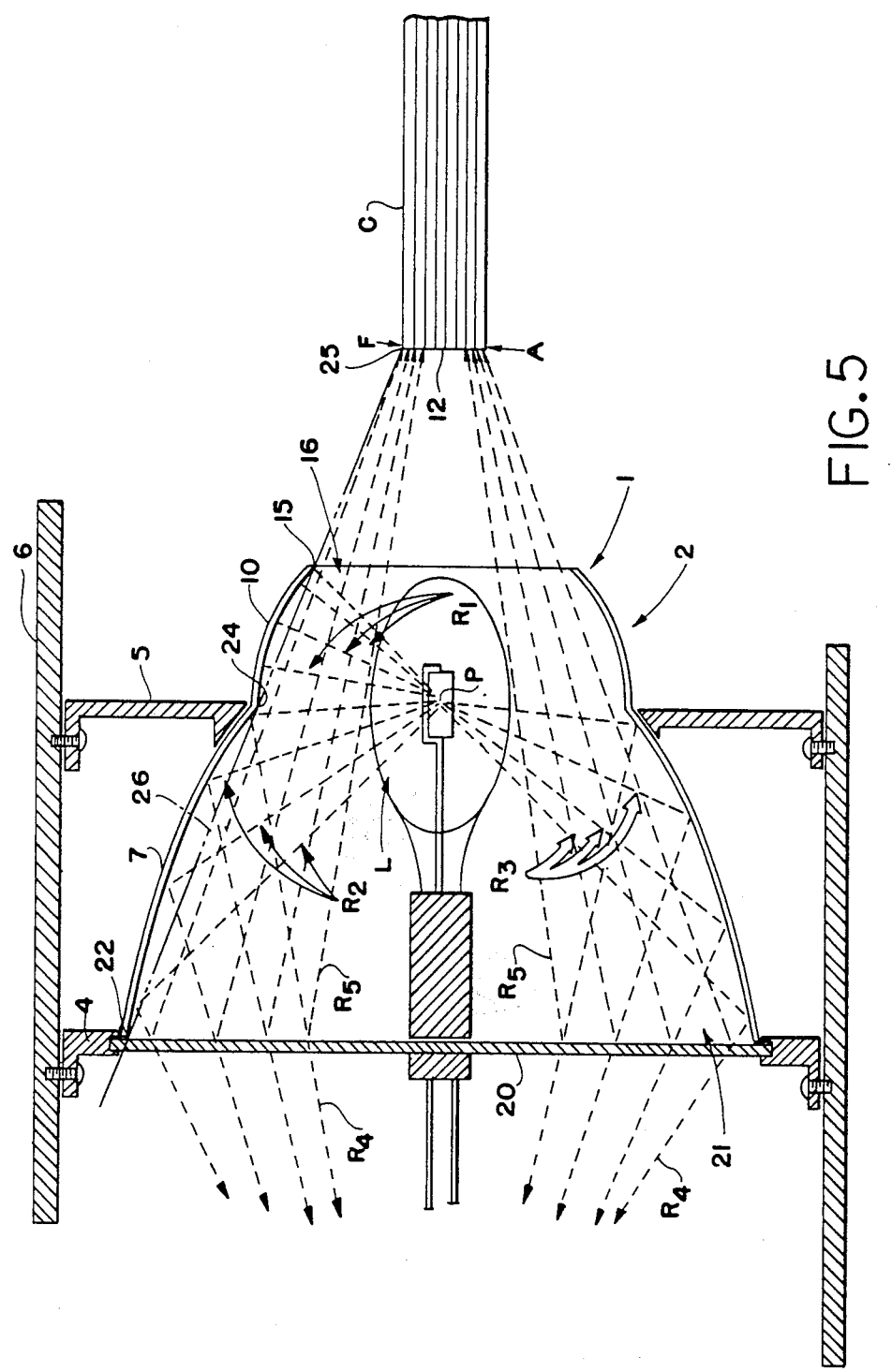
FIG. 5 is a schematic longitudinal section similar to FIG. 1 but showing a modified form of reflector system in accordance with this invention.

If such removal is not necessary, mirror 23 may be eliminated and the end 12 of the optical light cable C or other light receiving area A may be placed at a final focus F' exteriorly of the mouth 16 of the reflector 2 in coaxial alignment with the reflector as shown in FIG. 5. Otherwise, the details of construction and operation of the reflector system shown in FIG. 5 are identical to that shown in the FIG. 1 embodiment. Accordingly, the same reference numerals are used to identify like parts.

As schematically shown in FIG. 4, the ellipsoidal portion 7 of the reflector 2 commences at the intersection of a plane passing through the first focus P normal to the major axis X and extends forwardly therefrom in the direction of the major axis toward the minor axis Y. The hemispherical portion 10 of the reflector also commences at the same place as the ellipsoidal portion 7. Also, the hemispherical portion 10 has a center axis substantially coincident with the first focus P of the ellipsoidal portion 7. However, the hemispherical portion 10 extends rearwardly in the opposite direction from the ellipsoidal portion 7.

Preferably, each of the ellipsoidal and hemispherical portions 7, 10 extend (in opposite directions) over a distance of approximately 45° as measured from the first focus P. Moreover, it has been found that in order to maintain the resulting incident angles of acceptance of the light at the final focus F within a 60° solid angle cone, the eccentricity of the ellipsoidal portion of the reflector must fall between approximately 0.8 and 1.0. For best results, when the reflector is viewed in a two-dimensional longitudinal section as shown in FIGS. 1 and 5, the mouth opening edge 15, the point 24 where the ellipsoidal and hemispherical portions 7, 10 meet, the large opening edge 22 and the edge 25 of the target A all desirably fall substantially in a straight line 26, shown in phantom lines in FIGS. 1 and 5.

In a preferred form of reflector design in accordance with this invention, the ellipsoidal portion 7 of the reflector 2 has a semi-major axis X of approximately 10.88 inches and a semi-minor axis Y of approximately 6.087 inches and an eccentricity of approximately 0.829. Also, both the ellipsoidal focus and hemispherical center intersect at the first focus P as aforesaid, and the ellipsoidal and hemispherical portions 7, 10 extend over an arc distance of approximately 45° as measured from such first focus.

From the foregoing, it will now be apparent that the reflector systems of the present invention provide for the relatively efficient collection and focalization of light rays upon a relatively tight target or light receiving area preferably with minimum loss of optical energy and maximum removal of infra-red energy from a light source. While such reflector systems are primarily intended for fiber optical applications, it will be apparent that such systems can also be utilized for other illumination applications as well. With such systems, it is estimated that approximately 35% optical efficiency and approximately 99% non-optical efficiency can be obtained.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A reflector system comprising a reflector having an ellipsoidal portion and a hemispherical portion joined together at an intersection of a plane passing through a focus of said ellipsoidal portion normal to a major axis of said ellipsoidal portion, a hemisphere center of said hemispherical portion coinciding with said focus, a light source generally positioned at said focus, said ellipsoidal portion terminating in an opening forwardly of said focus covered by a mirror extending normal to the major axis of said ellipsoidal portion for redirecting light rays emitted from said light source back through said reflector, and said hemispherical portion terminating in another opening spaced rearwardly from said focus through which the light rays are redirected by said mirror to a final focus located exteriorly of said reflector.

2. A reflector system comprising a reflector having an ellipsoidal portion and a hemispherical portion, said ellipsoidal portion including an ellipsoidal focus within said reflector, said ellipsoidal portion extending forwardly of said focus, and said hemispherical portion extending rearwardly of said focus, and a light source generally positioned at said focus, said ellipsoidal and hemispherical portions being joined together at an intersection of a plane passing through said focus normal to a major axis of said ellipsoidal portion, said ellipsoidal portion terminating in an opening having an axis coinciding with a major axis of said ellipsoidal portion, said opening being covered by a mirror extending normal to said major axis for redirecting light rays emanating from said light source back through said reflector, said mirror including coating means for reflecting substantially all of the visible light generated by said light source and for allowing a major portion of the infra-red radiation generated by said light source to pass through said mirror.

3. A reflector system comprising a reflector having an ellipsoidal portion and a hemispherical portion, said ellipsoidal portion including an ellipsoidal focus within said reflector, said ellipsoidal portion extending forwardly of said focus, and said hemispherical portion extending rearwardly of said focus, and a light source generally positioned at said focus, said ellipsoidal and hemispherical portions being joined together at an intersection of a plane passing through said focus normal to a major axis of said ellipsoidal portion, said ellipsoidal portion terminating in an opening having an axis coinciding with a major axis of said ellipsoidal portion, said opening being covered by a mirror extending normal to said major axis for redirecting light rays emanating from said light source back through said reflector, said hemispherical portion terminating in a second opening through which the light rays are redirected by said mirror to the exterior of said reflector, and a target positioned exteriorly of said second opening, said target being located at a final focus for said reflector.

4. The reflector system of claim 3 wherein said final focus is in coaxial alignment with said second opening.

5. The reflector system of claim 3 further comprising another mirror disposed at an angle with respect to said second opening for redirecting the light rays passing through said second opening onto said target, said target having an axis which extends at an angle with respect to an axis of said second opening.

6. The reflector system of claim 5 wherein said another mirror is oriented at an angle of approximately 45° to the normal of said second opening for directing the light rays passing through said second opening onto said target, the axis of which is normal to the axis of said second opening.

7. The reflector system of claim 5 wherein said second mirror includes coating means for reflecting substantially all of the visible light impinging thereon and for allowing a major portion of the infra-red radiation impinging thereon to pass through said second mirror.

8. A reflector comprising an ellipsoidal portion and a hemispherical portion joined together at an intersection of a plane passing through a focus of said ellipsoidal portion normal to a major axis of said ellipsoidal portion, a hemisphere center of said hemispherical portion coinciding with said focus, said ellipsoidal portion terminating in an opening forwardly of said focus covered by a mirror extending normal to the major axis of said ellipsoidal portion for redirecting light rays emitted from a light source positioned at the focus back through said reflector, and said hemispherical portion terminating in another opening spaced rearwardly from said focus through which the light rays are redirected by said mirror exteriorly of said reflector.

9. The reflector of claim 8 wherein an edge of each of said openings in said ellipsoidal and hemispherical portions and a point at which said ellipsoidal and hemispherical portions are joined together all fall substantially in a straight line when said reflector is viewed in longitudinal section.

10. The reflector of claim 8 wherein said ellipsoidal portion and said hemispherical portion extend in opposite directions over a distance of approximately only 45° as measured from said focus.

11. The reflector of claim 8 wherein said ellipsoidal portion has a semi-major axis of approximately 10.880 inches and a semi-minor axis of approximately 6.087 inches, and an eccentricity of approximately 0.829.

12. The reflector of claim 8 wherein said ellipsoidal portion has a semi-major axis of approximately 10.9 inches and a semi-minor axis of approximately 6.1 inches.

13. The reflector of claim 12 wherein said ellipsoidal portion has an eccentricity of approximately 0.8.

14. A reflector system comprising a reflector having an ellipsoidal portion and a hemispherical portion, said ellipsoidal portion including an ellipsoidal focus within said reflector, said ellipsoidal portion extending forwardly of said focus, and said hemispherical portion extending rearwardly of said focus, and a light source generally positioned at said focus, said ellipsoidal and hemispherical portions being joined together at an intersection of a plane passing through said focus normal to a major axis of said ellipsoidal portion, said ellipsoidal portion terminating in an opening having an axis coinciding with said major axis, said opening being covered by a mirror extending normal to said major axis for redirecting light rays emanating from said light source back through said reflector, and said hemispherical portion terminating in a second opening through which the light rays are redirected by said mirror to a fixed focus located exteriorly of said reflector.

15. The reflector system of claim 14 wherein a hemisphere center of said hemispherical portion intersects said focus.

16. The reflector system of claim 14 further comprising a target positioned exteriorly of said second opening proximate said final focus.

17. The reflector system of claim 14 wherein said ellipsoidal portion extends over a distance of at least approximately 45° as measured from said focus.

18. The reflector system of claim 14 wherein said hemispherical portion extends over a distance of at least approximately 45° as measured from said focus.

19. The reflector system of claim 14 wherein said ellipsoidal portion and said hemispherical portion extend in opposite directions over a distance of approximately only 45° as measured from said focus.

20. The reflector system of claim 14 wherein an edge of each of said openings in said ellipsoidal and hemispherical portions and a point at which said ellipsoidal and hemispherical portions are joined together all fall substantially in a straight line when said reflector is viewed in longitudinal section.

21. The reflector system of claim 20 further comprising a target positioned exteriorly of said second opening, said target having an edge that also falls substantially in such straight line when said reflector is viewed in longitudinal section.

22. The reflector system of claim 14 wherein said ellipsoidal portion has a semi-major axis of approximately 10.880 inches and a semi-minor axis of approximately 6.087 inches.

23. The reflector system of claim 22 wherein said ellipsoidal portion has an eccentricity of approximately 0.829.

24. The reflector system of claim 14 wherein said ellipsoidal portion has a semi-major axis of approximately 10.9 inches and a semi-minor axis of approximately 6.1 inches.

25. The reflector system of claim 24 wherein said ellipsoidal portion has an eccentricity of approximately 0.8.

26. The reflector system of claim 25 wherein said ellipsoidal and hemispherical portions extend in opposite directions each over a distance of approximately only 45° as measured from said focus.

* * * * *